Patented Dec. 15, 1936

2,064,118

UNITED STATES PATENT OFFICE 2,064,118

PROCESSES OF PRODUCING RAYON

Charles A. Huttinger, Lakewood, and Edward R. Timlowski, Cleveland, Ohio, assignors to Acme Rayon Corporation, Cleveland, Ohio, a corporation of Ohio No Drawing. Application October 16, 1935, Serial No. 45,310

4 Claims. (Cl. 18—54)

Our invention relates to improved processes of producing rayon, particularly to improved processes of obtaining a desirably delustered yarn.

In carrying out our improved process, we first prepare cellulose xanthate by any approved process; for instance, make up a batch from a suitable cellulose base steeped in a caustic solution; for instance, a cellulose base consisting of 13 oz. of cotton pulp and 19 oz. of wood pulp steeped for approximately 1¼ hours in 18% caustic solution at a temperature range from 17.5° C. to 25° C. Subsequent to the steeping of the above-mentioned quantities of cellulose in the caustic solution and after pressing out the excess of caustic, the alkali-cellulose content weighs approximately 6 pounds. We grind the pressed alkali-cellulose for approximately 3½ hours at a temperature range from 17° C. to 28° C. The crumbs or ground alkali-cellulose are then aged from 60 hours up to 140 hours, the time of aging being dependent upon the temperature and the degree of viscosity desired in the viscose product. Temperature increases tend to age the crumbs more rapidly and to produce a viscose having lighter viscosity. For instance, with a constant time duration of 90 hours for aging, an increase in temperature will tend to make the viscose of lighter viscosity; with a constant temperature an increase in length of aging time will give a viscose of lighter viscosity.

The aged alkali-cellulose is subjected to a standard churning operation with carbon bisulphid, preferably for 2½ hours at a temperature of 25° C. If the temperature is increased, the churning operation is of a shorter duration, and if the temperature is decreased, the churning operation is a longer operation. We obtain the best results when the churning temperature does not exceed substantially 25° C., since higher temperatures tend to burn the alkali-cellulose and thus decrease the tensile strength of the final product. For the above-mentioned batch make-up, the amount of carbon bisulphid utilized in the churning operation is substantially ¾ pound. The color of the resultant cellulose xanthate is deep orange.

The cellulose xanthate is then subjected to a mixing operation to obtain the viscose solution, this operation being conducted for about 3 hours at a temperature of substantially 17.5° C. A temperature above 17.5° C. necessitates a reduction in the mixing time, inasmuch as with an increase in temperature the excess of carbon bisulphid has a churning action on the cellulose xanthate and tends to burn it. For instance, when the temperature reaches 25° C., we cut the mixing time to 2 hours.

The details of the mixing procedure are as follows:

For the above-mentioned batch make-up, 7 liters of caustic are used having 3.25% total alkalinity. This caustic is well mixed before introducing the cellulose xanthate. Then approximately one-quarter of 1% by weight of sodium sulphite is added to the viscose solution, the exact amount being dependent upon the particular delustered effect desired, but the maximum amount should not materially exceed one-quarter of 1%, this percentage being based on the cellulose content of the viscose. A preliminary mixing period of substantially one-half hour, before the addition of the sodium sulphite, is preferably practiced, in order to insure an even mixture of the sodium sulphite with the viscose, although satisfactory results are obtained by introducing the sodium sulphite initially into the mixture of xanthate and caustic, or putting it into the caustic before the mixture of xanthate and caustic is effected.

The viscose is then spun into rayon by any suitable standard method, the viscose during spinning giving off a very noticeable odor of $SO_2$ and the spun thread having a partially bleached appearance.

If desired, the thread spun with sodium sulphite viscose, in the manner above-described, could be desulphured by a standard desulphuring solution to produce a good lustrous yarn. For the production of a yarn having a desirable delustered effect, we desulphur with sodium sulphite and oxalic acid solution, as hereinafter described, the amount of delustering for a given percentage of solution strength of sodium sulphite and oxalic acid depending upon the sulphur content of the viscose. In either event, whether for the production of lustrous yarn or delustered yarn, the rayon package after spinning is washed with water for about one hour, preferably by an improved process of treating rayon cakes shown, described and claimed in a pending application Serial No. 724,113, to free the package of acid and salt. To produce a delustered yarn, desulphurization is then effected with a solution of sodium sulphite and oxalic acid, substantially 2% sodium sulphite plus 2% oxalic acid solution being used, the treatment being conducted at a temperature of the treating solution of substantially 60° C. and over substantially a one-half hour period. The percentages of either the sodium sulphite, or the oxalic acid, or both, in the desulphuring solution, can be varied to effect different degrees of delustering; and, furthermore, these percentages can be coordinated with the extent of the sulphur content of the viscose solution to obtain the desired delustering effect.

The use of a sodium sulphite solution for desulphuring permits the working of this purifying step on a reasonably light acid side and thus avoids the deleterious effects upon rayon package supports which are caused by alkaline desulphuring solutions.

After the desulphuring operation the yarn is subjected to a thorough water wash to free it from the desulphuring solution. The resultant yarn has very good strength and elongation and uniform color. If so desired, the desulphured and washed yarn can be bleached in a standard manner.

What we claim is:

1. A process of producing rayon consisting in making cellulose xanthate, mixing the same with a solution of caustic and sodium sulphite, spinning the resultant viscose solution, freeing the spun product of acid and salt, and then treating the spun product with a solution of sodium sulphite and oxalic acid.

2. A process of producing rayon consisting in making cellulose xanthate, mixing the same with a solution of caustic and sodium sulphite in which the sulphite content does not materially exceed one-quarter of one per cent by weight of the cellulose content of the xanthate, spinning the resultant viscose solution, freeing the spun product of acid and salt, and then treating the spun product with a solution of sodium sulphite and oxalic acid.

3. A process of producing rayon consisting in making cellulost xanthate, mixing the same with a dissolving caustic for substantially one-half hour, adding substantially one-quarter of one per cent by weight sodium sulphite compared to the cellulose content of the xanthate, continuing the mixing for substantially two and one-half hours, the mixing temperature being substantially 17.5° C., spinning the resultant viscose solution, freeing the spun product of acid and salt, and then treating the spun product with a solution of sodium sulphite and oxalic acid for substantially one-half hour, the treating temperature being substantially 60° C., and the sodium sulphite and oxalic acid utilized in the treating solution being each substantially two per cent.

4. A process of producing rayon consisting in making cellulose xanthate, mixing the same with a solution of caustic and sodium sulphite in which the sulphite content does not materially exceed one-quarter of one per cent by weight of the cellulose content of the xanthate, the mixing operation being conducted for about three hours at a temperature of substantially 17.5° C., spinning the resultant viscose solution, washing the spun product, and then treating the spun product with a solution of sodium sulphite and oxalic acid in which the sodium sulphite and oxalic acid contents are each substantially two per cent.

CHARLES A. HUTTINGER.
EDWARD R. TIMLOWSKI.